Nov. 3, 1970     J. C. PARKER     3,538,376

ARC CURRENT STABILIZATION BY CONTROL OF ELECTRODE FEED SPEED

Filed March 3, 1967

INVENTOR
JOHN C. PARKER
BY
*Larry R. Cassett*
ATTORNEY

United States Patent Office 3,538,376
Patented Nov. 3, 1970

3,538,376
ARC CURRENT STABILIZATION BY CONTROL OF ELECTRODE FEED SPEED
John C. Parker, Ramsey, N.J., assignor to Air Reduction Company, Incorporated, New York, N.Y., a corporation of New York
Filed Mar. 3, 1967, Ser. No. 620,460
Int. Cl. B23k 9/12
U.S. Cl. 314—69    7 Claims

ABSTRACT OF THE DISCLOSURE

Sensed variations in the arc current are utilized to correspondingly vary the duration of pulses in a train of pulses of substantially uniform amplitude and frequency, which pulses are used to drive an electrode feed motor at a speed which is proportional at any given frequency to pulse length, to stabilize the feed speed and the resulting arc current, and to permit a run-in start-up of a welding operation.

---

It is known that in an electric arc system wherein a consumable electrode, usually in the form of a wire, is fed into the arc, the arc length tends to stabilize as the melting rate of the electrode becomes equal to the linear rate at which the electrode is advanced toward the arc. At any given rate of advancement of the electrode, the melting rate increases as the tip of the electrode moves closer to the workpiece thereby shortening the arc gap and increasing the heat of the arc. It is also known that the electrode feed speed and the arc current are directly related, the arc current increasing directly with increase in feed speed.

It follows that the arc current can be controlled and set or predetermined by selecting the electrode feed speed. Furthermore, it follows that if the current varies, this variation can be counteracted by varying the feed speed in an inverse manner so that the speed variations tend to compensate for the current variations and the net result is the reduction or virtual elimination of the current variations.

In accordance with the invention, the motor that feeds the electrode into the arc region is of a type which can be driven by means of unidirectional electrical pulses, preferably regularly spaced in time and of substantially uniform amplitude and adjustable in length. Also, the motor type is such that the speed of the motor is proportional to the pulse length. Means are provided to select a predetermined pulse length which in turn determines the speed of the motor before the electric arc is established and the electrode is being advanced toward the workpiece but has not yet made contact with the workpiece. When this contact is made, and current passes through the contact, a current sensor senses the amplitude of the current and actuates means to shorten the pulse length. The amount of shortening is made proportional to the arc current sensed. The first effect of shortening the pulse length is to keep the electrode from piling up against the workpiece while the electrode is heated by the current therethrough and melts to form an arc. When the arc has formed, there are two opposing tendencies at work. One, the faster the motor turns the faster the electrode feed speed and the greater the arc current resulting. Two, the greater the arc current the greater the shortening of the pulses and the more the motor speed is reduced.

The net result is that the motor speed is stabilized at such a value that the current sensed is just enough to maintain that speed. The actual speed at which the motor is stabilized may be changed by varying the setting of the above mentioned means which determines the pulse length. This initial speed setting means can be calibrated in terms of actual arc current values to which the system becomes stabilized at the particular setting selected.

It will be evident that any change in the spacing between the electrode tip and the work surface effects at least a momentary change in the electrode feed speed relative to the work surface and consequently a change in the arc length and in the arc current. Because the adjustment of the motor speed can be made very rapid, the invention is effective to compensate continually for any changes in arc current, however caused, and provides for a high degree of stabilization of the arc current.

The invention may be used either with a hand held welding tool or with a machine held automatic or semiautomatic welding tool. In either case, the welding current is maintained substantially constant regardless of conditions which tend to vary the arc length, such as variations in the thickness of the workpiece or raised or lowered portions of the work surface. In the case of a hand held tool, compensation is also provided for hand motion toward or away from the work surface during the welding operation.

Other features, objects and advantages will appear from the following more detailed description of an illustrative embodiment of the invention, which will now be given in conjunction with the accompanying drawings.

Figure 1:
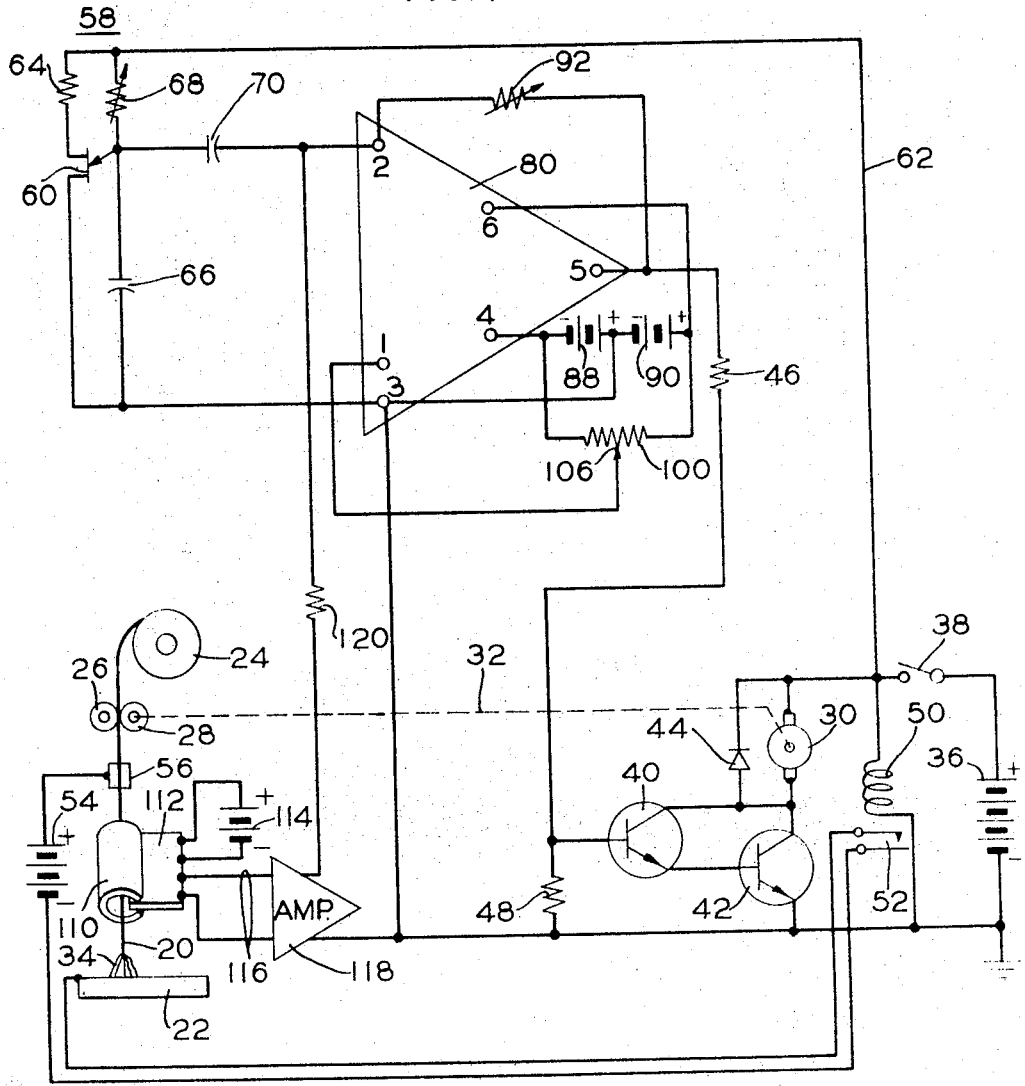
FIG. 1 is a schematic diagram of an embodiment of the invention.

Referring to FIG. 1, there is shown schematically a consumable welding electrode 20 arranged to be fed toward a welding arc 34 and a workpiece 22 from a storage spool 24 by means of drive rolls 26, 28, of which at least one roll, 28 as shown, is power driven as by an electric motor, the armature of which is represented schematically at 30. Field excitation for the motor may be supplied in any conventional manner (not shown). The mechanical drive between the armature 30 and the drive roll 28 is represented schematically by a broken line 32 and will generally involve speed reduction gearing.

Armature current for the electrode feed motor is supplied from any suitable source, represented as a battery 36 under the control of a switch 38 and transistors 40, 42.

The current in the transistors 40, 42 is in turn under the control of the output current from an amplifier 80. The output of the amplifier passes through a voltage divider comprising resistors 46 and 48 and a relatively small current from the common junction of the resistors 46 and 48 enters the base electrode of transistor 40, thereby controlling a relatively larger current from collector to emitter of the transistor. The current through transistor 40 enters the base electrode of transistor 42 thereby controlling a relatively still larger current from collector to emitter of that transistor. The combined collector-emitter currents of the two transsistors 40 and 42 constitute the current through the armature 30.

The armature 30 is shunted by a diode 44 which guards against current reversal through the armature and provides a substitute path for current in the motor armature in case of a sudden decrease in the conductivity of the transistors 40, 42, thereby protecting the transistors from excessive voltage caused by collapse of the magnetic field in the motor armature.

The closing of the switch 38 serves to connect the source 36 to the armature circuit including the transistors 40 and 42. The switch is also shown as serving to energize a relay winding 50 to close a terminal pair 52 which in turn closes a welding power circuit for the arc 34 from the workpiece 22 through a welding power source, represented as a battery 54 connected in reverse polarity through a contact shoe 56 and the electrode 20. Straight polarity may be substituted for reverse polarity if desired, or, alternating or pulsating current may be substituted.

In accordance with the invention, the output of the amplifier 80 varies whenever the arc current varies, and in such a sense as to change the feed speed of the electrode to compensate for variations in the arc current.

The manner in which the electrode feed speed is controlled through the amplifier 80 will now be described.

The amplifier 80 may be of any suitable type. In an embodiment of the invention that has been successfully operated, I have used as an amplifier in this position a device which is on the market under the designation of a monolithic operational amplifier, MC1530, obtainable from Motorola Semiconductor Products, Inc., of Phoenix, Ariz. This amplifier has ten terminals, numbered 1 through 10, of which for the present purpose I use only 1–6. The device accommodates inputs at terminal pairs 1–3 and 2–3 which inputs have opposing effects upon the output of the device. The output appears between the terminals 3 and 5. Power is supplied to the device 80 from two direct current sources 88, 90, illustrated as batteries, connected in series aiding relation, and preferably 6 volts each. The negative terminal of source 88 is connected to terminal 4, the positive terminal of source 90 is connected to terminal 6, and the common terminal of the sources 88 and 90 is connected to the terminal 3, which latter terminal constitutes a signal ground for the device. A feedback resistor 92 is advantageously connected between the terminals 2 and 5 to improve the linearity of response of the amplifier, as well as to stabilize the gain of the device. The device 80 functions as a direct current amplifier, providing an output which repeats the input in an inverted fashion, and is responsive to rapid changes in the input.

The output from the terminal pair 3–5 in the amplifier 80 is proportional to the difference between the voltage between terminals 2 and 3 on the one hand and the voltage between terminals 1 and 3 on the other hand.

In addition to regulating the motor speed to maintain the arc current substantially constant while the arc is in operation, the amplifier assists in effecting a scratch start or run-in start of the arc, that is, one in which the arc electrode runs into the workpiece, causing a short-circuit current which melts the electrode back to establish the arc.

The armature 30 is driven by a train of direct current pulses recurring at a substantially constant repetition rate.

The speed of the motor is substantially proportional to the pulse duration, which can be controlled as a proportional part of the total time interval occupied by a pulse and a space between that pulse and the next.

The pulses for driving the armature 30 are generated in a saw-tooth wave generating circuit 58 comprising a unijunction transistor 60 which is supplied with direct current from the source 36 by way of a lead 62 and a current limiting resistor 64 when the switch 38 is closed. The source 36 also serves to charge a timing capacitor 66 through an adjustable timing resistor 68. The capacitor and resistor form an RC circuit which may conveniently determine a repetition frequency of approximately 4000 hertz, although other frequencies may be used, depending upon the time constants of the motor. Each time the capacitor 66 has been built up in charge to a predetermined critical potential, the transistor 60 abruptly becomes highly conductive, discharging the capacitor nearly instantaneously, whereupon the transistor becomes nonconductive and a new cycle starts. The result is a wave of a saw-tooth type which is impressed across terminals 2 and 3 of the amplifier 80 by way of a coupling capacitor 70.

To select manually the proportionate length of pulses at the output of the amplifier 80, an adjustable source of potential is connected between terminals 1 and 3 of the amplifier, the source conveniently comprising a potentiometer 100 connected across the combined batteries 88 and 90.

Figure 2:
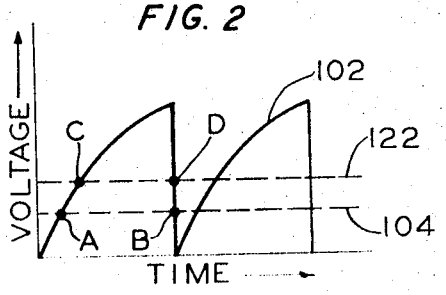
FIG. 2 is a set of graphs useful in explaining the means employed in the system of FIG. 1 for the control of motor speed.

FIG. 2 shows how the potentiometer serves to control the pulse length. The wave train impressed between terminals 2 and 3 of the amplifier is represented by waveform 102. The potential selected by means of the potentiometer 100 is represented by a horizontal broken line 104. The potentials represented by the lines 102 and 104 respectively are subtracted from each other in the amplifier, giving a shortened pulse of length AB as shown in the figure. The magnitude of AB is selected by positioning a movable contact 106 along the potentiometer 100. The pulse of length AB is repeated in the signal appearing between output terminals 3 and 5 of the amplifier 80. The pulse preferably is made strong enough to immediately saturate the transistors 40, 42, so that the successive pulses received by the armature 30 are of uniform amplitude; their repetition rate being determined by the RC circuit 66, 68, and their length by the setting of the potentiometer 100, in the absence of arc current. Thus, the setting of the potentiometer determines an initial value of feed speed for the electrode 20.

When there is arc current, the amount of arc current is sensed and used to further control the pulse length in such manner that the electrode feed speed is varied to compensate for variations in arc current and thus to maintain a substantially constant value of arc current.

Various means are known for sensing the arc current. I prefer to employ for this purpose a Hall effect magnetic flux sensor or probe to sense the magnetic flux which accompanies the arc current. To concentrate the magnetic flux, I use a split cylinder 110 of magnetic material surrounding a conductor that is carrying the arc current. In the gap in the cylinder, I place a Hall effect probe that is energized by axial current from a suitable source illustrated as a battery 114, and which generates an output transverse voltage in a conductor pair 116. The voltage in the pair 116 is impressed upon the input of an amplifier 118, which may be an operational amplifier similar to amplifier 80, giving an output which follows variations in the input voltage.

If desired, the split cylinder 110 may be dispensed with and the Hall effect probe may be placed directly in proximity to the electrode 20. In this case, greater amplification will generally be required of the amplifier 118. Alternatively, a conventional ammeter may be used in lieu of the Hall effect probe.

The output of the amplifier 118 is impressed between the terminals 2 and 3 of the amplifier 80 by way of an isolating resistor 120 in parallel with the saw-tooth wave from the RC circuit 66, 68, in opposing relationship to the saw-tooth wave, the result being as represented graphically in FIG. 2 by a horizontal broken line 122, determining a new and shorter pulse length CD. Whenever arc current is flowing, it is the pulse length CD which controls the motor speed rather than the pulse length AB.

At the start of a welding operation it will be assumed that the switch 38 is just being closed. The potentiometer contactor 106 is set for a desired initial speed of the motor. It is further assumed that the electrode 20 is not touching the workpiece 22 so that there is no arc current. Upon the closing of switch 38, the RC circuit is energized and the armature 30 receives the preset current and so is energized to feed the electrode toward the workpiece. Closing of switch 38 also energizes the relay winding 50, closing the contact pair 52 and preparing the arc circuit to pass current as soon as the electrode 20 makes contact with the workpiece 22.

When current starts, the pulse length is reduced from AB to a variable length CD which may approach zero length upon the magnitude of the current. The shortening of the pulse causes the motor speed to lessen, thereby preventing the electrode from piling up against the workpiece. When the short circuit is broken and arc current begins to flow, the arc current, being less than the short-circuit current obtained upon touching, allows the motor to speed up. There are now two opposing tendencies. The faster the motor runs, the greater the arc current and the shorter the pulses become. The shortening of the pulses tends to reduce the speed of the motor. Equilibrium occurs at some certain speed, which speed can be adjusted by means of potentiometer 100. For the guidance of the operator, the potentiometer 100 can be calibrated in terms of the desired equilibrium speed or arc current.

While illustrative forms of apparatus and methods in accordance with the invention have been described and shown herein, it will be understood that numerous changes may be made without departing from the general principles and scope of the invention.

What is claimed is:

1. Apparatus for stabilizing the arc current in an electric welding arc formed between a workpiece and a consumable wire electrode continuously advanced into the arc, comprising, in combination, welding wire electrode feed means, current sensing means to produce a signal proportional to arc current, control means connected to said feed and sensing means and responsive to the current signal to control the speed of the feed means whereby the arc current is maintained substantially constant at a predetermined value.

2. Apparatus according to claim 1, wherein said feeding means is driven by spaced electrical pulses of given repetition rate, the feed speed of said feeding means varies in proportion to the pulse duration, said control means including a source of driving pulses for said feeding means, said control means varying the pulse duration of pulses in inverse proportion to the arc current.

3. Apparatus according to claim 1, in which said means to sense the arc current comprises a Hall effect probe.

4. Apparatus according to claim 2, in which said source of driving pulses is a saw-tooth generator.

5. Apparatus according to claim 2, in which said driving pulse duration is controlled by the intersection of a constant but settable voltage with the ascending portion of a saw-tooth shaped voltage.

6. Apparatus according to claim 1, together with means connected to said wire feed means to determine the initial feed speed in the absence of arc current.

7. The method of stabilizing the arc current in an electric welding arc formed between a workpiece and a consumable wire electrode which is continually advanced into the arc by feed means, which method comprises the steps of sensing the arc current, and utilizing the sensed current to control the feed speed of said feed means to compensate for any variation in the sensed current, thereby to maintain the arc current substantially constant at a predetermined value.

References Cited
UNITED STATES PATENTS

| | | | |
|---|---|---|---|
| 2,921,222 | 1/1960 | Boag | 314—69 |
| 3,024,353 | 3/1962 | Brashear. | |
| 3,194,939 | 7/1965 | Hill | 219—110 X |
| 3,219,343 | 10/1965 | Sheheen | 318—20.290 X |
| 3,233,076 | 2/1966 | Vilkas. | |
| 3,376,374 | 4/1968 | Bobo | 13—13 |

BERNARD A. GILHEANY, Primary Examiner

R. N. ENVALL, JR., Assistant Examiner

U.S. Cl. X.R.

219—131